(12) United States Patent
Goodman et al.

(10) Patent No.: US 8,374,065 B2
(45) Date of Patent: Feb. 12, 2013

(54) DATA LIBRARY BACKGROUND OPERATIONS SYSTEM APPARATUS AND METHOD

(75) Inventors: Brian Gerard Goodman, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1918 days.

(21) Appl. No.: 11/470,964

(22) Filed: Sep. 7, 2006

(65) Prior Publication Data

US 2008/0065582 A1    Mar. 13, 2008

(51) Int. Cl.
*G11B 21/08* (2006.01)

(52) U.S. Cl. ...... 369/30.38; 720/632; 711/154; 711/163; 700/214; 369/30.39; 369/30.03; 369/30.4; 369/30.52; 369/30.6

(58) Field of Classification Search .......... None
See application file for complete search history.

(56) References Cited

U.S. PATENT DOCUMENTS

| | | | |
|---|---|---|---|
| 4,945,429 A * | 7/1990 | Munro et al. ............ | 360/92.1 |
| 5,594,922 A * | 1/1997 | Suzuki et al. ............ | 710/17 |
| 5,652,742 A | 7/1997 | Baca et al. | |
| 5,805,864 A | 9/1998 | Carlson et al. .......... | 395/500 |
| 5,986,835 A * | 11/1999 | Tanaka et al. ........... | 360/53 |
| 6,061,309 A | 5/2000 | Gallo et al. ............. | 369/34 |
| 6,185,165 B1 | 2/2001 | Jesionowski et al. ... | 369/34 |
| 6,957,291 B2 | 10/2005 | Moon et al. ............. | 710/302 |
| 7,039,924 B2 | 5/2006 | Goodman et al. ...... | 720/600 |
| 2005/0044456 A1 | 2/2005 | Fisher et al. ............ | 714/718 |
| 2005/0226059 A1* | 10/2005 | Kavuri et al. ........... | 365/189.05 |
| 2006/0013078 A1* | 1/2006 | Goodman et al. ...... | 369/30.01 |
| 2007/0101051 A1* | 5/2007 | Schultz .................. | 711/111 |
| 2007/0106840 A1* | 5/2007 | Estelle et al. ........... | 711/111 |

* cited by examiner

*Primary Examiner* — Joseph Feild
*Assistant Examiner* — Henok Heyi
(74) *Attorney, Agent, or Firm* — Kunzler Law Group, PC

(57) ABSTRACT

An apparatus, system, and method are disclosed for performing data library background operations. The present invention teaches one or more data storage drives capable of entering a phantom load mode and a library controller capable of initiating the phantom load mode for the data storage drives. The phantom load mode operates to hide the media status of the data storage drives from host computers during background operations involving the data storage drives. In certain embodiments, the data storage drives exit the phantom load mode as a result of a media unload request. In some embodiments, the library controller receives a media load request from a host computer during the background operation and completes the media load request upon completion of the background operation.

30 Claims, 6 Drawing Sheets

DATA LIBRARY BACKGROUND OPERATIONS SYSTEM APPARATUS AND METHOD

BACKGROUND OF THE INVENTION

1. Field of the Invention

This invention relates to systems, apparatus, and methods for managing a data library and more particularly relates to systems, apparatus, and methods for performing data library background operations.

2. Description of the Related Art

Data libraries provide an efficient and effective solution to storing and retrieving large quantities of data. Storing data in a data library typically includes storing data on data storage media such as cartridges, stored on shelves within the data library. Retrieving the data typically includes receiving a media load request from a host computer, physically retrieving the data storage media requested, and loading the data storage media in a data storage drive, thereby making the data storage media available to the host computer.

At times, data libraries perform background operations for management and maintenance purposes. A background operation may include cleaning a data storage drive, reading data from data storage media, performing data storage drive diagnostics, and more. Though performing background operations beneficially facilitates data library management, performing background operations can be problematic.

For example, background operations often involve loading data storage media into a data storage drive. Loading data storage media into a data storage drive often disrupts host computer processes because, from the perspective of the host computer, the data storage drive unexpectedly shows up with data storage media loaded therein. To overcome this disruption, a data library administrator must create ad hoc solutions such as only enabling background operations when the host computer will not be used or disabling background operations during certain host computer processes. Such ad hoc solutions increase the time, labor, and costs associated with managing a data library and may lead to an error or outage if not properly followed.

From the foregoing discussion, it should be apparent that a need exists for an enhanced system, apparatus, and method for performing data library background operations. Beneficially, such a system, apparatus and method would enable background operations to be performed without disrupting host computer processes.

SUMMARY OF THE INVENTION

The present invention has been developed in response to the present state of the art, and in particular, in response to the problems and needs in the art that have not yet been fully solved by currently available data library background operation solutions. Accordingly, the present invention has been developed to provide an apparatus, system, and method for performing data library background operations without disrupting host computer processes.

In one aspect of the present invention, a system for performing data library background operations includes one or more host computers, a plurality of storage shelves, one or more robot accessors, one or more data storage drives capable of entering a phantom load mode, and a library controller capable of initiating the phantom load mode for the data storage drives. The phantom load mode hides a media status of the data storage drives from the host computers during one or more background operations involving the storage drives.

A background operation may include cleaning the data storage drives, reading data from data storage media, writing data to data storage media, reading a cartridge memory of data storage media, and more. In certain embodiments, the library controller receives a media load request from a host computer during the background operation and completes the media load request upon completion of the background operation. In certain embodiments, the library controller initiates completion of the phantom load mode for the data storage drive. In certain embodiments, the data storage drives exit the phantom load mode upon completion of the background operation or as a result of a media unload request. In some embodiments, the library controller aborts the background operation upon reception of a media load request for the selected data storage drive.

In one aspect of the present invention an apparatus for performing data library background operations includes a storage control module configured to enter a phantom load mode that hides the media status of a data storage drive from one or more host computers during a background operation involving the data storage drive. In certain embodiments, the storage control module resides within the data storage drive. In other embodiments, the storage control module resides outside the data storage drive. In some embodiments, the storage control module communicates a drive empty status during the phantom load mode to the host computers regardless of whether data storage media is loaded in the data storage drive.

In another aspect of the present invention an apparatus for performing data library background operations includes a library control module that initiates a phantom load mode for a data storage drive. The phantom load mode hides a media status of the data storage drive from one or more host computers during a background operation involving the data storage drive. In certain embodiments, the library control module receives a media load request from a host computer during the background operation and completes the media load request upon completion of the background operation. In some embodiments, the library control module initiates completion of the phantom load mode for the data storage drive. In certain embodiments, the library control module aborts the background operation upon reception of a media load request for the data storage drive from a host computer.

A method of the present invention is also presented for performing data library background operations. The method in the disclosed embodiments substantially includes the operations necessary to carry out the functions presented above with respect to the described system and apparatus. In one embodiment, the method includes providing a data storage drive, providing a library controller, and initiating a phantom load mode with the library controller for the data storage drive. In some embodiments, the method includes the operation of initiating completion of the phantom load mode with the library controller for a data storage drive. In certain embodiments, the method includes aborting the background operation upon reception of a media load request from a host computer for a data storage drive.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
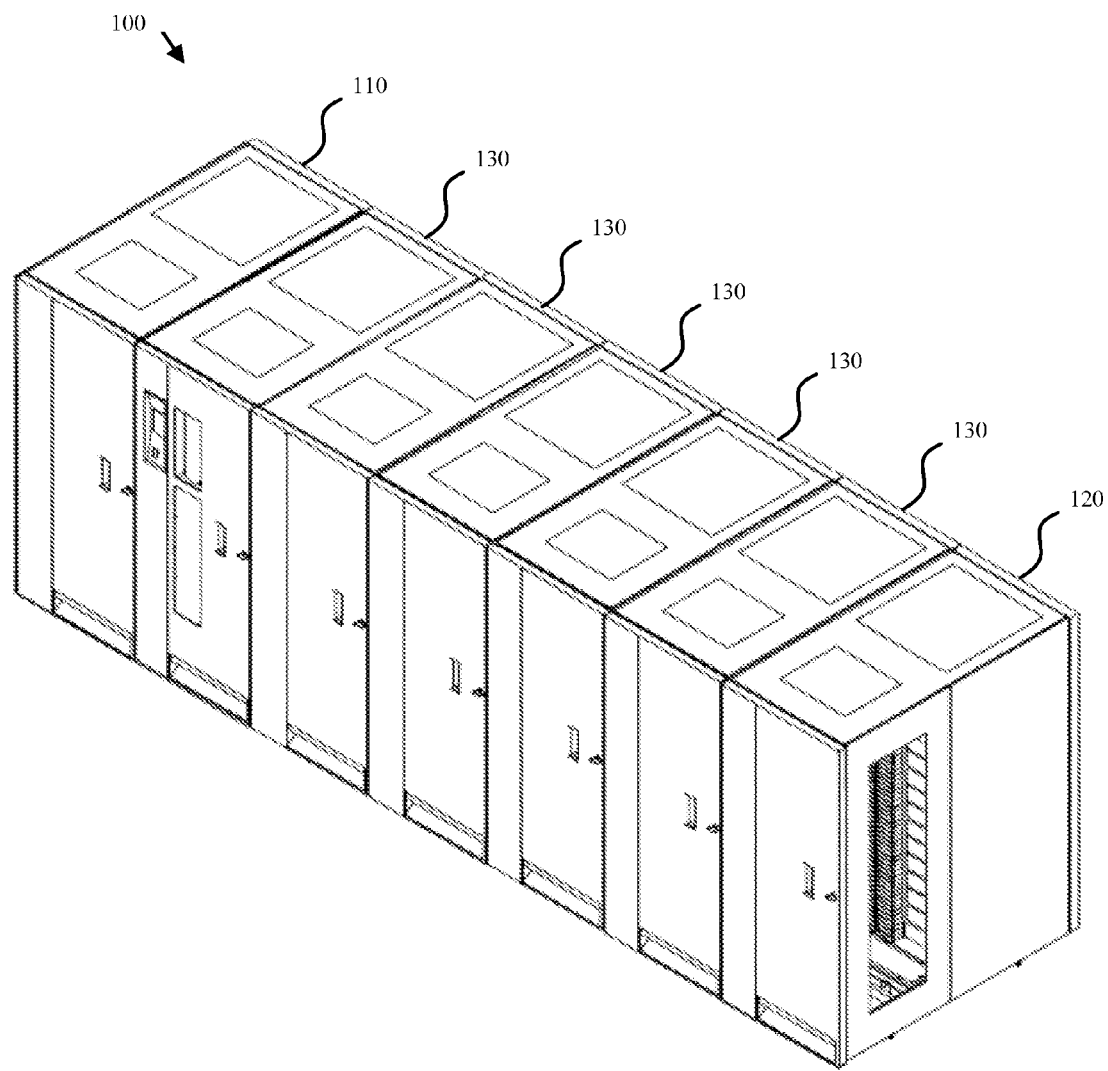
FIG. 1 is a perspective view of one embodiment of a data library in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a perspective view of a data library 100 in accordance with the present invention. The depicted data library 100 includes a left hand service bay 110, a right hand service bay 120, and multiple storage frames 130. Storage frames 130 may be added or removed to increase or reduce the size and/or functionality of the library 100. A data library 100 is often associated with a command source (not shown), such as one or more host computers, that communicate with the data library 100 to access the data stored therein.

Figure 2:
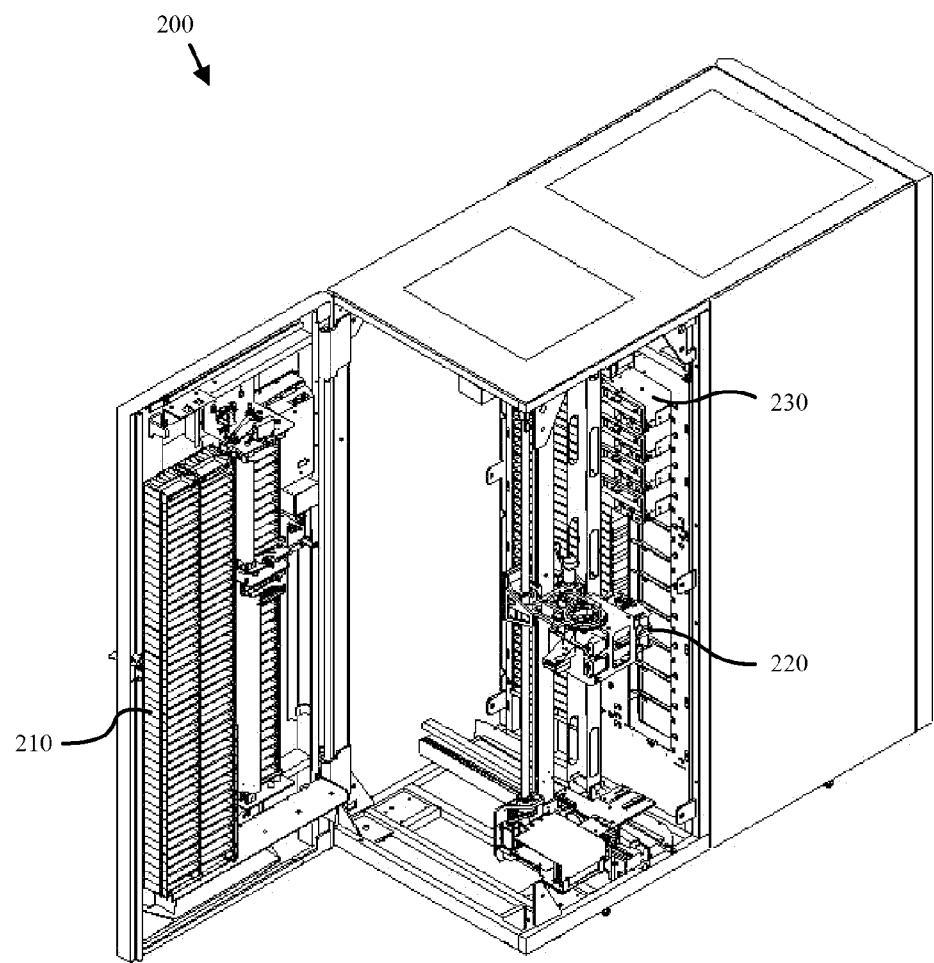
FIG. 2 is a perspective view of one embodiment of a storage frame in accordance with the present invention.

FIG. 2 is a perspective view of one embodiment of a storage frame 200 in accordance with the present invention. The depicted storage frame 200 may comprise one example of the storage frames 130 of FIG. 1 or may comprise the minimum configuration of library 100 of FIG. 1. The storage frame 200 includes an accessor 220 for retrieving data storage media from storage shelves 210 and loading the data storage media into one or more data storage drives 230. Loading data storage media into the data storage drives 230 makes the data storage media available to host computers (not shown).

Figure 3:
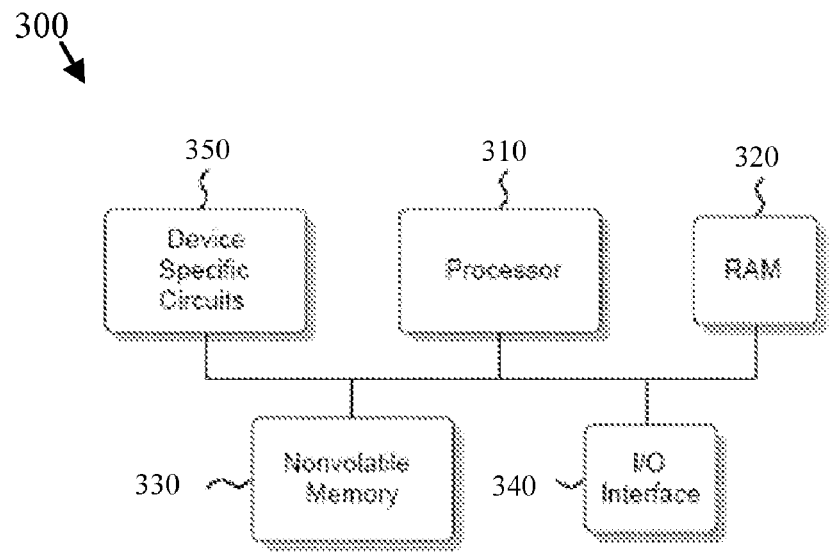
FIG. 3 is schematic block diagram of one embodiment of a library controller in accordance with the present invention.

FIG. 3 is schematic block diagram of one embodiment of a library controller 300 in accordance with the present invention. The depicted library controller 300 includes a processor 310, random access memory (RAM) 320, nonvolatile memory 330, an input/output interface 340, and device specific circuits 350. Alternatively, the RAM 320 and/or non-volatile memory 330 may be contained in the processor 310 as could the device specific circuits 350 and I/O interface 340. The processor 310 may comprise, for example, an off-theshelf microprocessor, custom processor, FPGA (Field Programmable Gate Array), ASIC (Application Specific Integrated Circuit), discrete logic, or the like.

The RAM (Random Access Memory) 320 is typically used to hold variable data, stack data, executable instructions, and the like. The nonvolatile memory 330 may comprise any type of nonvolatile memory such as, but not limited to, PROM (Programmable Read Only Memory), EEPROM (Electrically Erasable Programmable Read Only Memory), flash PROM (Programmable Read Only Memory), NVRAM (Non-Volatile Random Access Memory), MRAM (Magnetoresistive Random Access Memory), battery backup RAM, CD (Compact Disk), DVD (Digital Versatile Disk), hard disk drives, etc.

The nonvolatile memory 330 is typically used to hold the executable firmware and any nonvolatile data. The I/O interface 340 comprises a communication interface that allows the processor 310 to communicate with devices external to the controller. Examples may comprise serial, parallel, or optical interfaces such as but not limited to RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, I/O interface 340 may comprise network or wireless interfaces such as but not limited to Ethernet, CAN (Controller Area Network), 802.11 (Wi-Fi), X.25 (WAN), Bluetooth, etc. Still further, I/O interface 340 may comprise combinations thereof.

The device specific circuits 350 provide additional hardware to enable the controller 300 to perform unique functions such as, but not limited to, motor control of a cartridge gripper. The device specific circuits 350 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 350 may reside outside the controller 300.

The library controller 300 facilitates data library processes such as communicating with host computers, receiving and performing media load requests, conducting inventory operations, performing background operations, and more. In some embodiments, a data library 100 may include a distributed control system as referred to in U.S. Pat. No. 6,356,803, or may include multiple library controllers that are not distributed. Herein, library controller may comprise a single processor or controller or may comprise multiple processors or controllers. As will be detailed in subsequent figures, the library controller 300 of the present invention may initiate a phantom load mode for the data storage drive.

Figure 4:
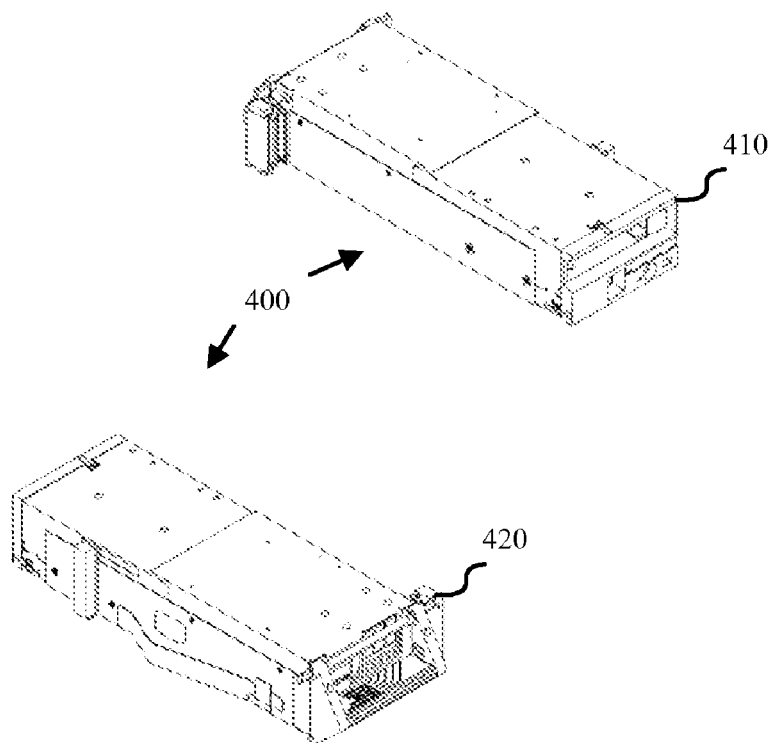
FIG. 4 is a perspective view of one embodiment of a data storage drive in accordance with the present invention.

FIG. 4 is a perspective view of one embodiment of a data storage drive in accordance with the present invention. FIG. 4 illustrates a front side 410 and back side 420 of one embodiment of a data storage drive 400. The data storage drive 400 comprises a hot-swap drive canister. This is only an example and is not meant to limit the present invention to hot-swap drive canisters. In fact, any data storage drive configuration may be used whether or not the data storage drive 400 comprises a hot-swap canister. As will be detailed in subsequent figures, the data storage drive 400 may enter a phantom load mode and thereby enable the performance of background operations that do not disrupt host computer processes.

Figure 5:
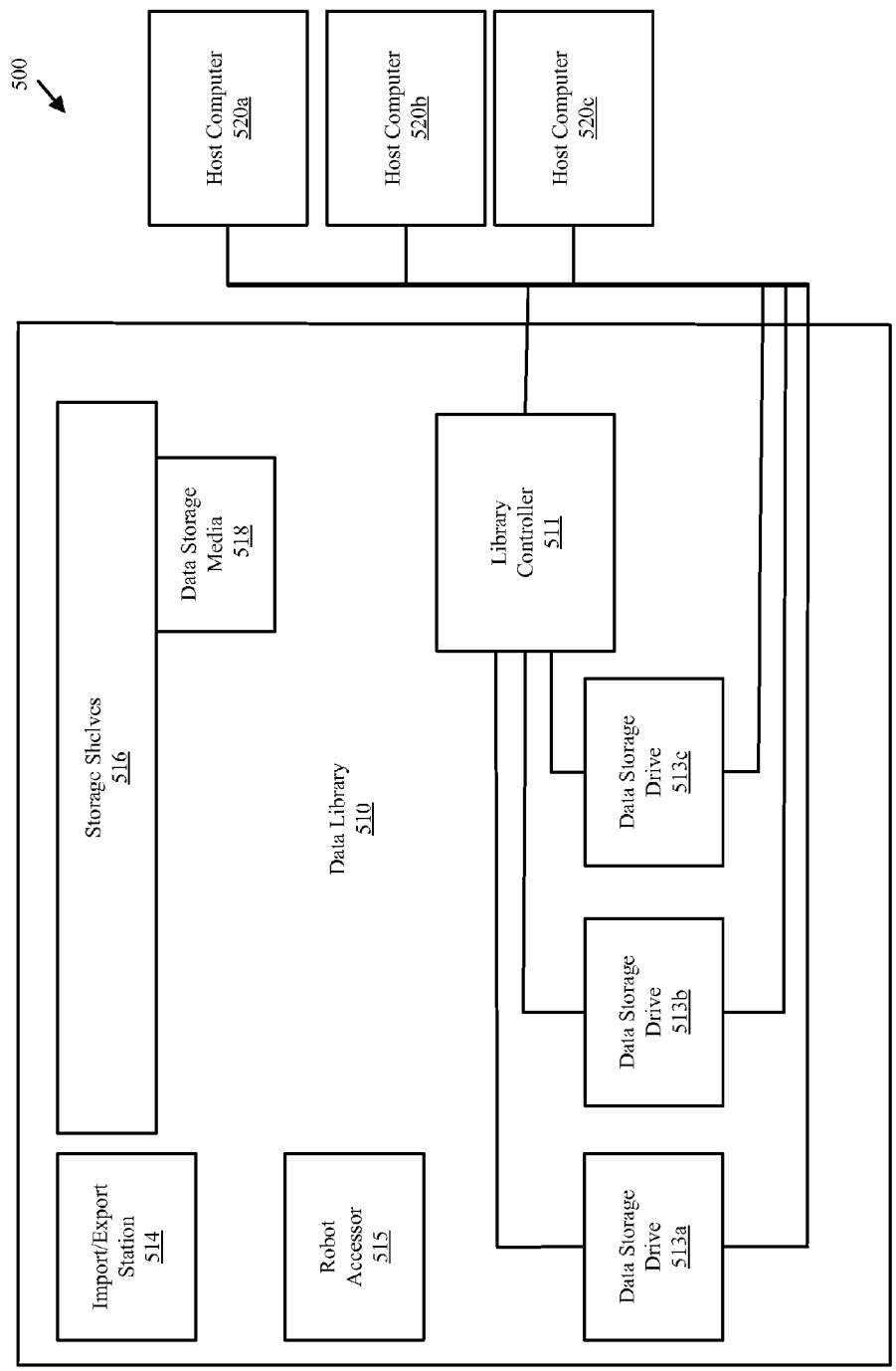
FIG. 5 is a schematic block diagram of one embodiment of a data library background operations system in accordance with the present invention.

FIG. 5 is a schematic block diagram of one embodiment of a data library background operations system 500 in accordance with the present invention. The depicted system 500 includes a data library 510 and host computers 520. The components of the system 500 cooperate to enable the performance of data library background operations without disrupting host computer processes.

In certain embodiments, the library controller 511 initiates a phantom load mode for a data storage drive 513. The phantom load mode hides the media status of the data storage drive 513 from the host computer 520. The library controller 511 may initiate one or more background operations during the phantom load mode which may include loading data storage media into the data storage drive 513. Hiding the media status of the data storage drive 513 enables the data library 510 to perform background operations without disrupting the host computer 520 by eliminating the possibility that the host computer 520 will unexpectedly detect data storage media in the data storage drive 513.

The library controller 511 may receive a media load request from a host computer 520 and postpone performance of the media load request until after the background operation is complete. The media load request may be for the drive performing the background operation or another drive. If the media load request is for another drive, the library may perform the media load request while the background operation continues, or it may not. In certain embodiments, the data storage drive 513 exits the phantom load mode when the background operation is complete. In some embodiments, the data storage drive 513 exits the phantom load mode in response to a media unload request. Accordingly, the system 500 is capable of completing media load requests even when received in the middle of a background operation.

In certain embodiments, the library may abort the background operation when a media load request is received for that drive. This may be required to avoid a host timeout for the media load request, depending on how long the background operation will take to complete. If the background operation is aborted, phantom load mode may exit normally through any of the described methods. Alternatively, the library may provide the drive with a command or message indicating that the background operation should be aborted and this may also be used to indicate that the drive should exit phantom load mode.

In certain embodiments, the robot accessor 515 is one example of the robot accessor 220 of FIG. 2. The robot accessor 515 may include grippers for physically retrieving data storage media 518 from the storage shelves 516 and transporting the data storage media 518 to the data storage drives 513. The data storage drives 513 may be any type of drive that uses removable media to read and/or write data with respect to the data storage media, including but not limited to magnetic media (such as magnetic tape or disks), optical media (such as optical tape or disks), holographic media (such as holographic tape or disks), electronic media (such as PROM, EEPROM, flash PROM, MRAM, Compactflash™, Smartmedia™, Memory Stick™, etc.), or other suitable media.

Typically, the data stored in removable media is resident on data storage media that is contained within a cartridge and referred to as a data storage media cartridge. An example of a data storage media cartridge that is widely employed in removable automated data storage libraries for mass data storage is a magnetic tape cartridge. In certain embodiments, the Import/Export Station 514 allows data storage media to be inserted into the library and/or removed from the library without disrupting library operation.

The host computers 520 communicate with the drives 513 over a host interface. There may be a number of host interfaces coupling certain host computers 520 to certain drives 513 or there may be one host interface coupling all them together. The host computers 520 may communicate with the library controller 511 over the same host interface as one or more drives 513 or another host interface.

Alternatively, the host computers 520 may communicate with the library controller 511 through one or more drives 513 as referred to in U.S. Pat. No. 6,434,090. In this case the library controller 511 may only be directly coupled to one or more drives 513 and not directly coupled to any host computers 520. One example of coupling the library controller 511 to the host computers 520 through one or more drives 513 is the SCSI T10 standard for ADI (Automation Drive Interface) bridging, as is known to those of skill in the art. The library controller 511 communicates with the drives 513 over a library-drive interface.

The host interface and/or the library-drive interface may comprise any communication interface known to those of skill in the art. For example, serial, parallel, or optical interfaces such as but not limited to RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, the host interface and/or library-drive interface may comprise network or wireless interfaces such as but not limited to Ethernet, SAN (Storage Area Network), CAN (Controller Area Network), 802.11 (Wi-Fi), X.25 (WAN), Bluetooth, etc. Still further, the host interface and/or library-drive interface may comprise combinations thereof.

Figure 6:
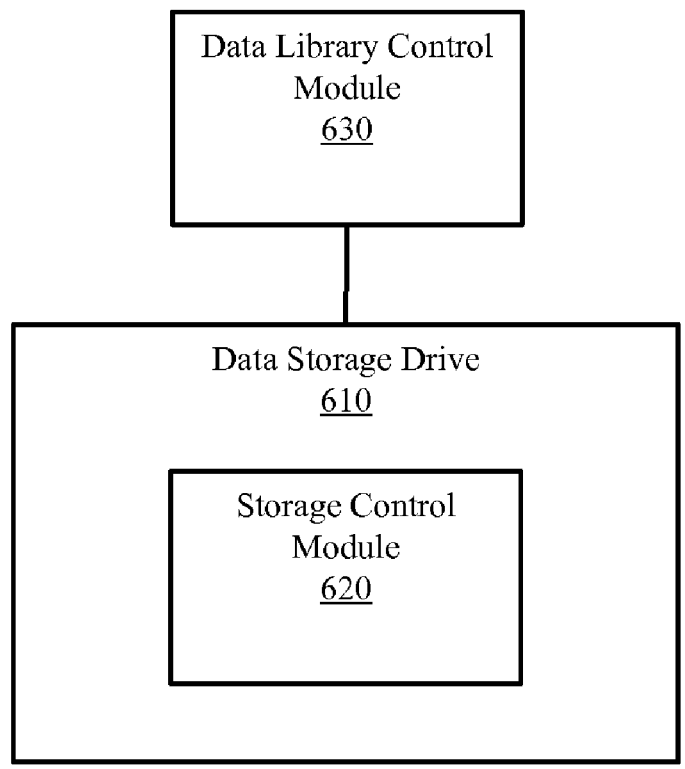
FIG. 6 is a schematic block diagram of one embodiment of a data storage drive and library control module in accordance with the present invention.

FIG. 6 is a schematic block diagram of one embodiment of a data storage drive 610 and library control module 630 in accordance with the present invention. The library control module 630 may be located partially or wholly within a library controller such as the library controller 511. Similarly, the storage control module 620 may reside entirely within the data storage drive 610. Alternately, the storage control module 620 may reside partially or wholly outside the data storage drive 610 and the library control module may be located outside a library controller, for example, as a driver or utility executing on a host, or as an external computer or controller.

The data library control module 630 and the storage control module 620 may each comprise a controller similar to controller 300 of FIG. 3. The data storage drive 610 and library control module 630 function cooperatively to provide a phantom load mode that enables the execution of background operations without disrupting host computers or host applications. Herein, host, host system, host computer, and host application may be used interchangeably to refer to any computer, hardware, or software that is coupled to a library and/or coupled to the data storage drives of a library, for purposes of accessing data on removable media.

In certain embodiments, the storage control module 620 enables the data storage drive 610 to enter a phantom load mode and hide the true media status of the data storage drive from one or more host computers (not shown). Hiding the true media status may include communicating a drive empty status to one or more host computers, regardless of whether media is actually loaded into the data storage drive 610. Accordingly, because of the phantom load mode, the host computers associated with the data storage drive 610 may operate as though no media were present in the data storage drive 610.

Examples of background operations associated with the phantom load mode include, without limitation, cleaning the data storage drive 610, reading data from data storage media, writing data to data storage media, reading a cartridge memory of data storage media, writing a cartridge memory of data storage media, performing media diagnostics, performing storage drive diagnostics, performing data library diagnostics, encrypting data storage media, decrypting data storage media, re-keying encrypted data storage media, and more. The type of background operation performed during the phantom load mode is not intended to limit the scope of the present invention.

In some embodiments, the data storage drive 610 exits the phantom load mode in response to completion of a background operation or in response to receiving a media unload request. Exiting the phantom load mode in response to a media unload request or in response to the completion of the background operation expedites the transition out of the phantom load mode such that the data storage drive 610 is once again ready to cooperate in a media load request and communicate the true media status of the data storage drive 610 to host computers 510.

The library control module 630 may initiate the phantom load mode in the data storage drive 630, for example, by sending a particular command or message to the storage control module 620. In some embodiments, the phantom load mode continues throughout one or more background operations involving the data storage drive 610. The library control module 630 may also initiate completion of the phantom load mode for the data storage drive 610 at the end of one or more background operations.

Figure 7:
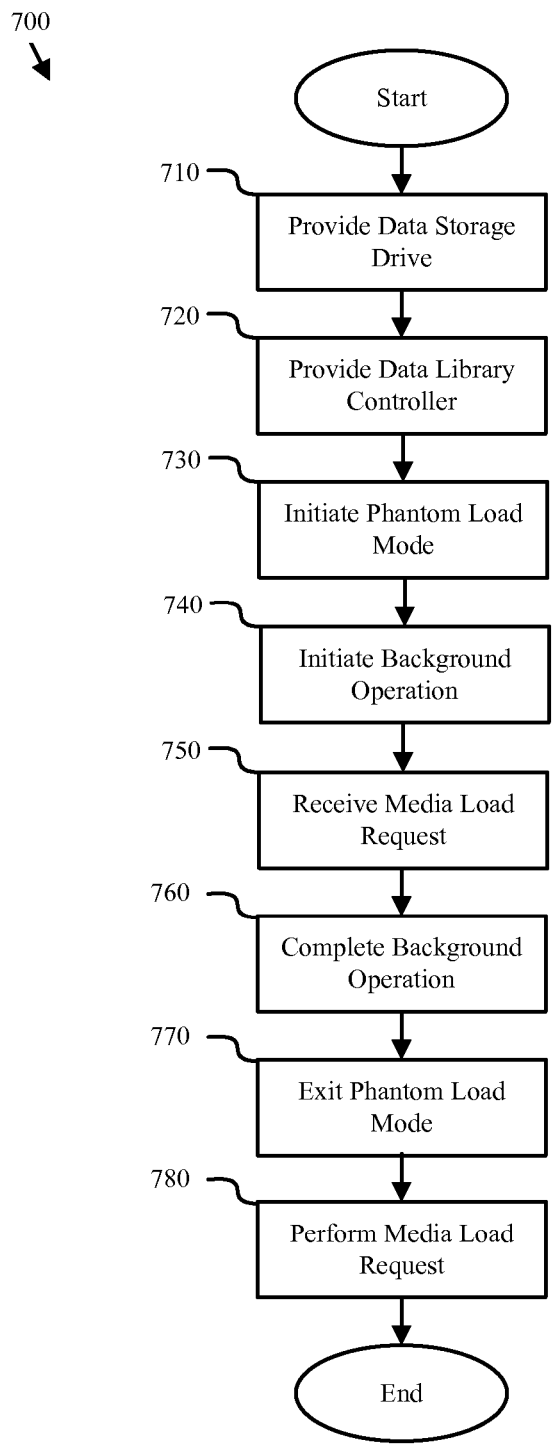
FIG. 7 is a flow chart diagram of one embodiment of a method for performing data library background operations in accordance with the present invention.

FIG. 7 is one embodiment of a method 700 for performing data library background operations in accordance with the present invention. The depicted method 700 includes the operations of providing 710 a data storage drive, providing 720 a library controller, initiating 730 a phantom load mode, initiating 740 a background operation, potentially receiving 750 a media load request, completing 760 the background operation, exiting 770 the phantom load mode, and performing 780 the media load request. The operations of the method 700 illustrate a typical sequence of operations for performing a data library background operation.

Providing 710 a data storage drive may include providing a data storage drive consistent with the data storage drive 513 of FIG. 5 or the data storage drive 610 of FIG. 6. The drive may be provided at time of library manufacture, library and/or drive installation, setup, configuration, or reconfiguration. Herein, providing a data storage drive refers to the availability of a data storage drive for performing a background operation. Providing 720 a library controller may include providing a library controller consistent with the library controller 511 of FIG. 5 or the library control module 630 of FIG. 6. The library controller may be provided at time of library manufacture, installation, setup, configuration, or reconfiguration. Herein, providing a library controller refers to the availability of a library controller for performing a background operation.

Initiating 730 a phantom load mode may include the library controller 511 initiating a phantom load mode for the data storage drive 513. This may comprise a command or message through a library-drive interface between the library controller 511 and the data storage drive 513 as was discussed. The phantom load mode hides the media status of the data storage drive 513 from host computers 520.

Initiating 740 a background operation may include the library controller 511 initiating a background operation that includes loading data storage media into the data storage drive 513. Because the data storage drive 513 is in phantom load mode, the host computers 520 associated with the data storage drive 513 may be unaware that data storage media has been loaded into the data storage drive 513. Accordingly, the background operation may be performed without disrupting the processes of the host computers 520. An example of a background operation associated with the phantom load mode may include a drive cleaning operation. For example, the data library controller 511 may load a cleaning cartridge into the data storage drive 513.

Another example of a background operation associated with the phantom load mode may include reading and/or writing data storage media. For example, the data library controller 511 may maintain library information on one or more data storage cartridges and it may be necessary to access or update the information from time to time. The data storage drive 513 may be required to read and/or write data from/to the data storage cartridge.

Another example of a background operation associated with the phantom load mode may include reading and/or writing a cartridge memory of data storage media. For example, the data library controller 511 may provide statistical information about the library or some of its components. It may be necessary to read a cartridge memory to provide certain media and/or drive statistics. If the library is not capable of reading and/or writing the cartridge memory then the library may use the data storage drive 513 to read and/or write the cartridge memory as a background operation.

A cartridge memory may comprise any type of wired or wireless memory or RFID tag associated with a data storage cartridge, as is known to those of skill in the art. An example of a removable media cartridge that contains a wireless cartridge memory is the LTO (Linear Tape Open) Ultrium tape cartridge. An example of a removable media cartridge that contains a wired cartridge memory is the Sony AIT (Advanced Intelligent Tape) cartridge.

Another example of a background operation associated with the phantom load mode may include performing media diagnostics. For example, the data library controller 511 may perform a diagnostic on any media that has exhibited a certain number of errors or retry operations. This may be useful to isolate potential problems between a data storage drive 513 and a media cartridge. In this case, a cartridge may be loaded to another data storage drive 513 to determine if the problem follows the cartridge. In addition, another cartridge may be loaded to the original data storage drive 513 to determine if the problem follows the data storage drive 513.

Another example of a background operation associated with the phantom load mode may include performing data library and/or storage drive diagnostics. For example, the data library controller 511 may provide a means to automatically or manually test a data storage drive by loading a diagnostic or scratch cartridge in the drive and performing diagnostic operations such as reading and/or writing data.

Another example of a background operation associated with the phantom load mode may include encrypting and/or decrypting data on a data storage media cartridge. For example, it may be necessary to encrypt some or all of the data on a cartridge that will be exported from the library. The library controller 511 may use a data storage drive 513 to encrypt data that has been stored on a cartridge. In another example, it may be necessary to change the encryption of some or all of the data on a cartridge. In this case, the library controller 511 may use a data storage drive 513 to read data from a cartridge with one key and use another key to re-encrypt the data on the cartridge.

Another example of a background operation associated with the phantom load mode may include re-keying encrypted data storage media. Re-keying refers to changing one or more encryption keys associated with data stored on a cartridge. For example, a cartridge may contain one or more data keys that are encrypted with a key encrypting key (KEK). Changing the KEK may effectively change the encryption of the entire contents of the data storage media because the data key is encrypted or protected by the KEK. It may be necessary to change encryption keys on a periodic basis, after a potential security exposure, when transferring a cartridge to another location, when providing another entity with data cartridges, etc.

These are just a few examples of background operations and many different operations and variations may be implemented. The type of background operation performed during the phantom load mode is not intended to limit the scope of the present invention.

Receiving 750 a media load request may include the library controller 511 receiving a request from a host computer 520 to load data storage media into a data storage drive 610 that is being used to perform a background operation. The media load request may also be received through a user interface of the library or through a remote computer or another interface of the library. The library controller 511 may postpone performing the media load request until after the background operation is complete.

The media load request may be for the data storage drive performing a background operation or it may be for another data storage drive that is not performing a background operation. If the media load request is for another data storage drive, the data library may perform the media load request while the background operation continues. Alternatively, the library may postpone performing the media load request until after the background operation is complete, even if the media load request is not for a drive that is performing a background operation.

In certain embodiments, the data library may abort the background operation when a media load request is received for that storage drive. This may be required to avoid a host timeout for the media load request, depending on how long the background operation will take to complete. If the background operation is aborted, the phantom load mode may exit normally through any of the described methods. Alternatively, the library may provide the data storage drive with a command or message indicating that the background operation should be aborted, and this may also be used to indicate that the data storage drive should exit the phantom load mode.

Completing 760 the background operation may include removing the data storage media from the data storage drive 513 or any other operation related to the background operation. For example, if the background operation entailed the library loading data storage media into the data storage drive 513, completion of the background operation may occur when the library unloads data storage media from the drive. In another example, if the background operation comprises a cleaning operation, the background operation may be completed when the drive has been cleaned.

Exiting 770 the phantom load mode may include communicating the true media status of the data storage drive 513 to the host computers 520. In certain embodiments, exiting 770 the phantom load mode may be an automatic response to removing data storage media from the data storage drive 513. For example, the storage control module 620 may exit phantom load mode when instructed by the data library control module 630 to unload or eject data storage media.

In some embodiments, exiting 770 the phantom load mode may be an automatic response to completing the background operation. For example, the background operation may comprise a drive cleaning operation and the storage control module 620 may exit phantom load mode upon completion of the cleaning operation. In some embodiments, exiting 770 the phantom load mode may be in response to a command or message from library control module 630 to exit phantom load mode and/or to terminate the background operation. Performing 780 the media load request may include retrieving data storage media of the postponed media load request, loading the data storage media in the data storage drive 513, and potentially communicating the media status of the data storage drive 513 to the host computer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for performing data library background operations, the apparatus comprising:
   a storage control module entering a phantom load mode by communicating a drive empty status for a first data storage drive to at least one host computer to hide a media status of the first data storage drive from the at least one host computer and initiating a background operation for the first data storage drive; and
   the storage control module receiving a media load request and continuing the background operation if the media load request is for a second data storage drive else aborting the background operation and exiting the phantom load mode if the media load request is for the first data storage drive.

2. The apparatus of claim 1, wherein the storage control module exits the phantom load mode upon completion of the background operation.

3. The apparatus of claim 1, wherein the storage control module exits the phantom load mode as the result of a media unload request.

4. The apparatus of claim 1, further comprising a library control module configured to initiate the phantom load mode for the first data storage drive.

5. The apparatus of claim 4, wherein the library control module is further configured to initiate completion of the phantom load mode for the first data storage drive.

6. The apparatus of claim 1, wherein the background operation is selected from the group consisting of cleaning the first data storage drive, reading data from data storage media, writing data to the data storage media, reading a cartridge memory of the data storage media, writing a cartridge memory of the data storage media, performing media diagnostics, performing storage drive diagnostics, performing data library diagnostics, encrypting data storage media, decrypting data storage media, and re-keying encrypted data storage media.

7. The apparatus of claim 1, wherein the storage control module resides within the first data storage drive.

8. The apparatus of claim 1, wherein the storage control module resides outside the first data storage drive.

9. The apparatus of claim 1, wherein the storage control module is further configured to communicate the drive empty status during the phantom load mode to the at least one host computer regardless of whether data storage media is loaded in the first data storage drive.

10. An apparatus for performing data library background operations, the apparatus comprising:
    a library control module initiating a phantom load mode for a first data storage drive; and
    a storage control module entering the phantom load mode by communicating a drive empty status for the first data storage drive to at least one host computer to hide a media status of the first data storage drive from at the least one host computer, initiating a background operation for the first data storage drive, and receiving a media load request and continuing the background operation if the media load request is for a second data storage drive else aborting the background operation and exiting the phantom load mode if the media load request is for the first data storage drive.

11. The apparatus of claim 10, wherein the storage control module resides within the first data storage drive.

12. The apparatus of claim 10, wherein the storage control module is configured to exit the phantom load mode in response to a media unload request.

13. The apparatus of claim 10, wherein the library control module is configured to exit the phantom load mode upon completion of the background operation.

14. The apparatus of claim 10, wherein the library control module is further configured to initiate completion of the phantom load mode for the first data storage drive.

15. The apparatus of claim 10, wherein the library control module is further configured to receive a media load request from a host computer during the background operation and complete the media load request upon completion of the background operation.

16. The apparatus of claim 10, wherein the library control module is further configured to abort the background operation upon reception of a media load request for the first data storage drive from a host computer.

17. The apparatus of claim 10, wherein the background operation is selected from the group consisting of cleaning the first data storage drive, reading data from data storage media, writing data to the data storage media, reading a cartridge memory of the data storage media, writing a cartridge memory of the data storage media, performing media diagnostics, performing storage drive diagnostics, performing data library diagnostics, encrypting data storage media, decrypting data storage media, and re-keying encrypted data storage media.

18. A system for performing data library background operations, the system comprising:
    at least one host computer;
    a plurality of storage shelves;
    at least one robot accessor;
    at least one data storage drive;
    a library controller initiating a phantom load mode for a selected first data storage drive of the at least one data storage drive; and
    a storage control module entering a phantom load mode by communicating a drive empty status for the first data storage drive to the at least one host computer to hide a media status of the first data storage drive from the at least one host computer, initiating a background operation for the first data storage drive, receiving a media load request, and continuing the background operation if the media load request is for a second data storage drive else aborting the background operation and exiting the phantom load mode if the media load request is for the first data storage drive.

19. The system of claim 18, wherein the first storage drive exits the phantom load mode upon completion of the background operation.

20. The system of claim 18, wherein the first storage drive exits the phantom load mode in response to a media unload request.

21. The system of claim 18, wherein the background operation is selected from the group consisting of cleaning the first data storage drive, reading data from data storage media, writing data to the data storage media, reading a cartridge memory of the data storage media, writing a cartridge memory of the data storage media, performing media diagnostics, performing storage drive diagnostics, performing data library diagnostics, encrypting data storage media, decrypting data storage media, and re-keying encrypted data storage media.

22. The system of claim 18, wherein the library controller receives a media load request from the at least one host computer during the background operation, and is further configured to complete the media load request upon completion of the background operation.

23. The system of claim 18, wherein the library controller aborts the background operation upon reception of a media load request for the first data storage drive.

24. A computer program product comprising a computer-readable storage medium tangibly embodying a program of machine-readable instructions executable by a digital processing apparatus to perform operations for performing data library background operations, the operations comprising: initiating a phantom load mode with the library controller by communicating a drive empty status for a first data storage drive to at least one host computer to hide a media status of the first data storage drive from the at least one host computer initiating a background operation for the first data storage drive; and receiving a media load request and continuing the background operation if the media load request is for a second data storage drive else aborting the background operation and exiting the phantom load mode if the media load request is for the first data storage drive.

25. The computer program product of claim 24, further comprising exiting the phantom load mode when media is unloaded from the first storage drive.

26. The computer program product of claim 24, further comprising initiating completion of the phantom load mode with a library controller for the first data storage drive.

27. The computer program product of claim 24, wherein the background operation is selected from the group consisting of cleaning the first data storage drive, reading data from data storage media, writing data to the data storage media, reading a cartridge memory of the data storage media, writing a cartridge memory of the data storage media, performing media diagnostics, performing storage drive diagnostics, performing data library diagnostics, encrypting data storage media, decrypting data storage media, and re-keying encrypted data storage media.

28. The computer program product of claim 24, further comprising communicating the drive empty status to the at least one host computer during the background operation, regardless of whether data storage media is loaded in the first data storage drive.

29. The computer program product of claim 24, further comprising receiving a media load request from the at least one host computer during the background operation and completing the media load request upon completion of the background operation.

30. The computer program product of claim 24, further comprising aborting the background operation upon receipt of a media load request from a host computer for the first data storage drive.

* * * * *